No. 812,165. PATENTED FEB. 6, 1906.
J. L. CONNABLE, DEC'D.
C. A. CONNABLE, EXECUTRIX.
TIRE.
APPLICATION FILED APR. 3, 1901.
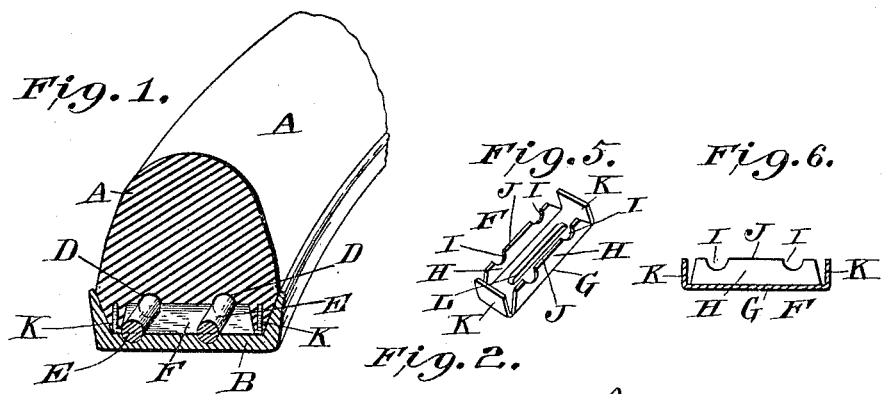
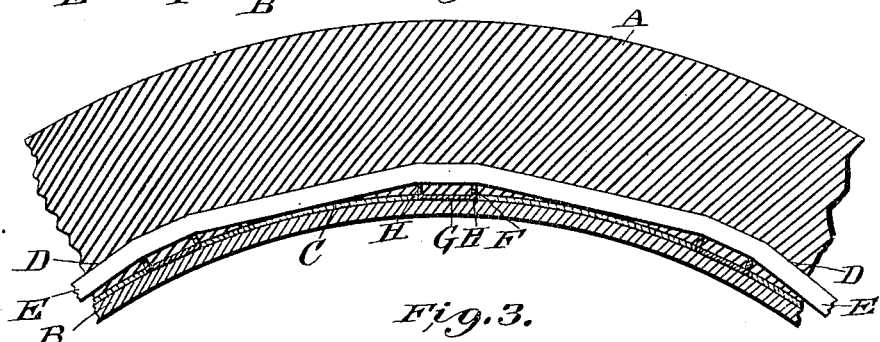
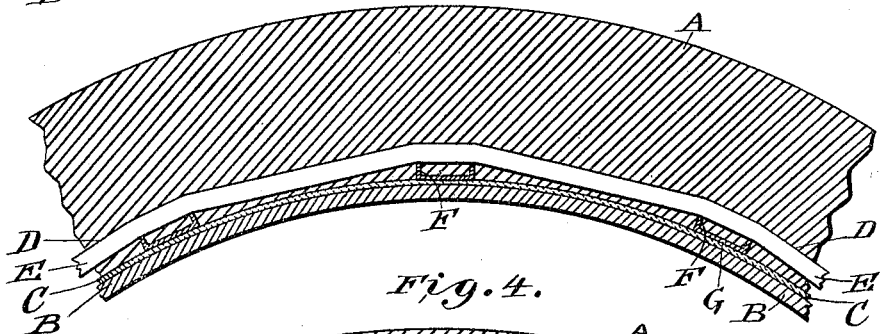
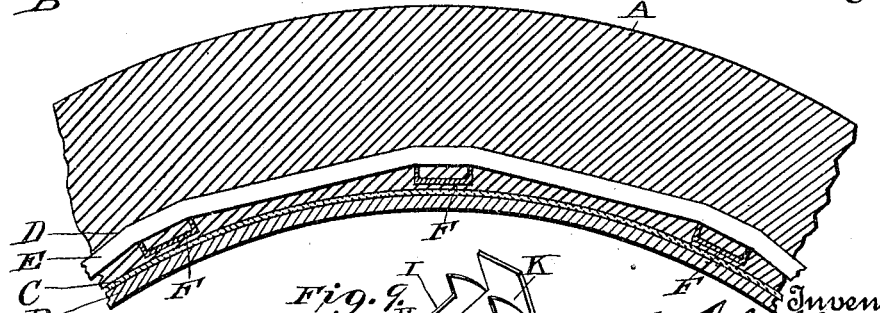

UNITED STATES PATENT OFFICE.

JOHN L. CONNABLE, OF CHATTANOOGA, TENNESSEE; CAROLINE AUGUSTA CONNABLE, EXECUTRIX OF SAID JOHN L. CONNABLE, DECEASED, ASSIGNOR OF ONE-HALF TO FRANK L. CONNABLE, OF WILMINGTON, DELAWARE.

TIRE.

No. 812,165.     Specification of Letters Patent.     Patented Feb. 6, 1906.

Application filed April 3, 1901. Serial No. 54,167.

*To all whom it may concern:*

Be it known that I, JOHN L. CONNABLE, a citizen of the United States, residing at Chattanooga, in the county of Hamilton and State of Tennessee, have invented certain new and useful Improvements in Tires, of which the following is a specification, reference being had therein to the accompanying drawings.

My invention relates to rubber tires for vehicles, and particularly to those tires with which are employed a retaining-band, a strip with rolled or wire edges, rods with rounded edges, a wire or wires, or similar devices for holding the rubber tire on the rim.

The object of this invention is to improve the method of securing and holding the tire to the rim by preventing the retaining means from moving within the tire or from resting or pressing upon the tire, so as to wear or cut through the same or deaden the resiliency thereof, while at the same time obviating the necessity of employing supporting bolts or screws passing through the rim.

To this end my invention consists in suspending the retaining means on embedded bearing-plates which have a solid and rigid bearing on the rim, either directly against the rim or against a non-resilient section of the bottom portion of the tire, consisting either of the canvas covering of the tire-bottom or of a thin section of mixed rubber and canvas or rubber alone and which portion of the tire bears in turn directly upon the rim. In any case whether the supporting-plate bears directly upon the rim or whether the canvas alone or the practically non-resilient section of the tire-body is interposed between the said plates and the rim the plates will have a solid support and on these plates the retaining means will be suspended independently of the rubber of the tire. The retaining means thus supported will not wear or cut into the tire or lessen the resiliency thereof, and both the retaining means and the tire will be prevented from loosening and be held permanently in place.

My invention also comprises means for preventing the edges of the plate cutting into the tire and for strengthening the plate, as hereinafter described.

One form of my plate is illustrated in my recent patent, No. 659,509, of October 9, 1900; but that patent is restricted to particular forms of the bearing-plate for one or more retaining wires or rods. The present application is to cover the solid support for the bearing-plates and the retaining means suspended and supported entirely thereon and thereby and also the additional features of construction accomplishing the results above outlined.

The invention is illustrated in the accompanying drawings, in which—

Figure 1 is a perspective view of tire and rim broken away, showing retaining means and bearing-plate in place. Fig. 2 is a longitudinal sectional view showing bearing-plate next the rim. Fig. 3 is a similar view showing bearing-plate with merely the canvas interposed between the same and the rim. Fig. 4 is a similar view showing a practically non-resilient section of mixed rubber and canvas between the plate and rim. Fig. 5 is a detail perspective of plate shown in the previous figures. Fig. 6 is a similar view of plate with strengthening-rib omitted. Fig. 7 is a similar view of modified form of plate. Fig. 8 is a similar view of another form of plate. Fig. 9 is a similar view of a form of plate designed for flat bands.

Referring to the drawings, A is the rubber tire of the usual construction, which is carried upon the channeled rim B. The tire is provided at its base or bottom next the rim with a strip of canvas C, molded with the rubber. The tire is shown as provided with two continuous channels or passages D; but one or any desired number of such channels or passages may be formed, according to the number of retaining devices desired. The retaining means may consist of wires, wire rods, or flat bands; but in the drawings wire rods E are represented.

The supporting device for the retaining means consists of a bearing plate or bridge F. A number of these plates are embedded in the rubber tire A and are located therein at intervals of from one to three inches apart or at greater or less intervals around the entire circumference of the tire. These bearing-plates, made of any suitable material, but preferably of metal, comprise a body portion G, flat or curved to conform to the rim and provided with one or more outwardly-extending lugs, lips, or bridges H, preferably formed by rolling or bending up the sides that are adapted to support the retaining wire or rod and which are provided with a notch or lateral projections otherwise formed, so as to hold the retaining means from lateral displacement. In Figs. 1 and 2 the bearing-plates are shown as bearing directly upon the rim B. In Fig. 3 the plates are represented as bearing upon the inner surface of the canvas covering of the tire. The canvas being practically non-resilient, the plates will have a solid bearing on the channeled rim. To more thoroughly protect the plate from moisture and guard against wear of the canvas, the section of tire interposed between the plate and rim may be one of mixed rubber and canvas; but in such case the coating or layer of rubber must be of such thinness as to be non-resilient. In all these arrangements the plate will have a rigid and solid bearing on the rim. The edges of the notched or recessed portions of the bridges or lugs H extend slightly within the area of the passages or channels D, so that the retaining means, which pass freely through the passages, will be suspended independently of the rubber and without pressure against the walls of the passages. To effect and maintain at all times the suspension on their bearing-plates so highly desirable and advantageous, this rigid support or bearing for the plates is essential. Without such a solid bearing and where the bearing-plate is surrounded at base and sides by the softer rubber of the tire-body the strain of the retaining means and the wear and strain will sooner or later produce a compression and deadening as well as a wearing away of such rubber seat for the bearing-plates, which will result in the loosening of the retaining means and the cutting through of the bottom of the tire. In practice when the wires or rods are drawn tightly over the notched portions I of the bridges that portion of each wire or rod between two bearings will be almost in a straight line and there will be a bend of the wires or rods at each side of the bearing-plate. As shown in Figs. 1 to 4, the bearing-plates may have at their ends a snug and tight bearing, either inside or outside of the canvas, against the flanges of the channeled rim, so as to effectually insure against any lateral movement; but my invention is not limited to this arrangement.

In Fig. 5 is illustrated the preferred form of plate designed to be used in my invention, in which the bridges H consist of long flanges, one at each side, extending almost the length of the plate and provided with opposite semicircular notches I and intermediate straight portions J. At each end of the bearing-plate there is provided an upturned or rolled projection or flange extending at a right angle or any other desired angle from the body of the plate and forming with the bridges a channel in the plate, into which the rubber is molded, whereby the plate is firmly held from moving in the tire, while at the same time the upturned or rolled flanges round off the edges and prevent cutting of the tire. The plate is adapted to be provided with a longitudinal strengthening-rib L; but the rib may be dispensed with in this form of plate, as is illustrated in Fig. 6. Such rib, however, is of special importance in the form of bearing-plate shown in Fig. 7, in which two bridges or lugs H are located at diagonally opposite corners of the plate, as set forth in my Patent No. 659,509. With this construction a transverse strain is brought centrally across the bearing-plate by the pressure of the wires on opposite ends, and the longitudinal rib serves to resist this strain.

In Fig. 8 a plate is shown provided with a single bearing bridge or lug turned up from the central portion of each side edge of the plate and adapted to receive and support a single wire or rod.

Fig. 9 shows a plate adapted to receive and suspend a flat band as a retaining means, and for this purpose the notch or recess I is widened, so as to leave a long bearing edge and end projections N.

It is obvious that as far as the feature of the rigid bearing of the plate on the rim is concerned any style of plate and any form of holding bridge or lug may be employed.

Having thus described my invention, what I claim is—

1. In a rubber tire in combination with a rim, retaining means, a passage or passages in the tire for said retaining means, a rigid bearing-plate supported solely by its bearing in the rim and engagement with the tire and having a rigid bearing on the rim and provided with a thin, sharp projecting portion having its bearing edge extending into said passage or passages whereby said retaining means are suspended independently of the rubber tire and without pressure on the walls of said passage or passages, substantially as described.

2. In a rubber tire in combination with a rim, retaining means, a rigid bearing-plate having a rigid bearing on the rim and provided with a bridge or lug projecting at an angle thereto having an edge over which said retaining means are drawn and stretched, said edge formed with embracing portions adapted to receive and support said retaining means and hold the same out of contact with the resilient portion of the tire, said plate supported solely by said bearing on the rim and the projection of the bridge or lug into the tube, substantially as described.

3. In a rubber tire, in combination with a rim, retaining means for the tire, a rigid bearing-plate provided with a projecting bridge or lug adapted to support said retaining means and a thin non-elastic section of the tire between said plate and said rim whereby said plate will be given a rigid bearing on said rim but will be retained within said tire and protected from the weather said plate supported solely by its bearing from and on the rim and engagement of said bridge with the tire, substantially as described.

4. In a rubber tire, in combination with retaining means, a series of separated rigid bearing-plates independent of the rim and provided with base portions having a rigid bearing thereon said plates embedded in the tire, and having projecting bridges rising from said base portions over which said retaining means are stretched and bent, and held independently of the rubber, substantially as described.

5. In a rubber tire having a retaining-wire, a bearing-plate for said retaining-wire having all of its edges flanged, substantially as described.

6. In a rubber tire, a retaining-wire, a bearing-plate for said retaining-wire having its end edges rolled or bent up at an angle to the body portion of the plate and forming rounded edges and holding-flanges, substantially as described.

7. In a rubber tire, retaining means, a bearing-plate having side flanges extending at an angle from the plate and on which the retaining means are supported, and end flanges forming with the side flanges a rubber-gripping channel in the plate, substantially as described.

8. In a rubber tire, a retaining-wire, a bearing-plate having diagonally opposite supporting-bridges, and a strengthening-rib extending longitudinally of the plate, substantially as described.

In testimony whereof I affix my signature in presence of two witnesses.

JOHN L. CONNABLE.

Witnesses:
E. H. ROLSTON,
O. W. BAIR.